US012693411B2

(12) United States Patent　　　(10) Patent No.: US 12,693,411 B2
Murakami et al.　　　　　　　　　(45) Date of Patent: Jul. 28, 2026

(54) ELECTRONIC DEVICE

(71) Applicant: KYOCERA Corporation, Kyoto (JP)

(72) Inventors: Youhei Murakami, Yokohama (JP);
Masayuki Sato, Yokohama (JP);
Satoshi Kawaji, Yokohama (JP);
Masamitsu Nishikido, Yokohama (JP)

(73) Assignee: KYOCERA Corporation, Kyoto (JP)

( * ) Notice: Subject to any disclaimer, the term of this
patent is extended or adjusted under 35
U.S.C. 154(b) by 289 days.

(21) Appl. No.: 18/552,155

(22) PCT Filed: Mar. 14, 2022

(86) PCT No.: PCT/JP2022/011420
§ 371 (c)(1),
(2) Date: Sep. 22, 2023

(87) PCT Pub. No.: WO2022/209834
PCT Pub. Date: Oct. 6, 2022

(65) Prior Publication Data
US 2024/0176015 A1　　May 30, 2024

(30) Foreign Application Priority Data

Mar. 29, 2021　(JP) ................................. 2021-056002

(51) Int. Cl.
*G01S 13/931* 　　(2020.01)
*G01S 7/35* 　　(2006.01)
*G01S 13/04* 　　(2006.01)
(52) U.S. Cl.
CPC ............ *G01S 13/931* (2013.01); *G01S 7/354*
(2013.01); *G01S 13/04* (2013.01); *G01S*
*2013/93271* (2020.01)
(58) Field of Classification Search
CPC ..... G01S 13/931; G01S 7/032; H01Q 1/2283;
H01Q 1/3233
(Continued)

(56) References Cited

U.S. PATENT DOCUMENTS 7,836,558 B2 　11/2010 　Schmitz et al.
8,085,185 B2 * 12/2011 　Stewart ................... H01P 5/222
342/159
(Continued)

FOREIGN PATENT DOCUMENTS

CN 　211348620 U 　8/2020
CN 　212008910 U 　11/2020
(Continued)

OTHER PUBLICATIONS

Sakakibara, K et al.; "Bandwith Comparison of Topside Waveguide-
to-Microstrip Transitions with Back-Short Waveguide and with
Double-Layer Substrate in Millimeter-Wave Band"; 13th European
Conference on Antennas and Propagation (EuCAO 2019); Mar. 31,
2019-Apr. 5, 2019; total 4 pages.

*Primary Examiner* — Michael W Justice
(74) *Attorney, Agent, or Firm* — Studebaker Brackett
PLLC

(57) ABSTRACT

An electronic device includes a transmission unit that trans-
mits a transmission wave from a transmission antenna; a
reception unit that receives, from a reception antenna, a
reflected wave of the transmission wave; a controller that
detects an object that reflects the transmission wave; a power
supply device that supplies electric power to at least any of
the foregoing components; and a substrate having the fore-
going components thereon. The transmission and reception
antennas are disposed on a first surface of the substrate. The
controller and the power supply device are disposed on a
second surface of the substrate opposite to the first surface.
The substrate includes a waveguide that guides the trans-
mission wave and/or the reflected wave between the first and
second surfaces and is covered with an electromagnetic
wave shielding member apart from the second surface by a (Continued)

distance of ¼ of a wavelength of the transmission or reflected wave.

7 Claims, 7 Drawing Sheets

(58) Field of Classification Search
USPC ........................................................ 342/175
See application file for complete search history.

(56) References Cited

U.S. PATENT DOCUMENTS

| 8,089,394 | B2 * | 1/2012 | Stewart | .................... | G01S 7/034 |
| | | | | | 342/115 |
| 8,223,067 | B2 * | 7/2012 | Moulton | ................. | G01S 7/354 |
| | | | | | 342/159 |
| 8,541,058 | B2 * | 9/2013 | Fisher | .................... | B05D 3/108 |
| | | | | | 427/376.6 |
| 9,860,965 | B2 * | 1/2018 | Recker | ................. | H05B 47/105 |
| 10,444,340 | B2 * | 10/2019 | Nagaishi | .................. | H01Q 1/38 |
| 11,411,445 | B2 * | 8/2022 | Takizawa | .................. | H02P 5/46 |
| 11,567,192 | B2 * | 1/2023 | Kim | .......................... | H01P 3/08 |
| 12,270,933 | B2 | 4/2025 | Tainaka et al. | | |
| 12,418,096 | B2 * | 9/2025 | Astorga | .............. | H01Q 1/2283 |
| 2002/0190891 | A1 * | 12/2002 | Viana | ................... | H01Q 21/064 |
| | | | | | 342/28 |
| 2008/0062038 | A1 * | 3/2008 | Ouchi | ..................... | G01S 7/032 |
| | | | | | 342/175 |
| 2011/0020539 | A1 * | 1/2011 | Fisher | .................... | B05D 3/108 |
| | | | | | 977/843 |
| 2011/0102240 | A1 * | 5/2011 | Stewart | ................ | H01Q 21/065 |
| | | | | | 342/159 |
| 2011/0102241 | A1 * | 5/2011 | Stewart | ................. | G01S 13/583 |
| | | | | | 342/104 |
| 2011/0102246 | A1 * | 5/2011 | Moulton | ................. | G01S 7/032 |
| | | | | | 342/159 |
| 2012/0280855 | A1 * | 11/2012 | Moulton | ............. | H03D 9/0633 |
| | | | | | 342/159 |
| 2014/0306776 | A1 * | 10/2014 | Eom | ........................ | H01P 3/003 |
| | | | | | 333/246 |
| 2016/0178730 | A1 * | 6/2016 | Trotta | ................... | G01S 13/931 |
| | | | | | 342/175 |
| 2017/0223807 | A1 * | 8/2017 | Recker | ................. | H05B 47/115 |
| 2018/0267161 | A1 * | 9/2018 | Nagaishi | .................. | G01S 7/03 |
| 2019/0113601 | A1 * | 4/2019 | Trotta | ................... | G01S 13/931 |
| 2020/0321711 | A1 * | 10/2020 | Baek | .................... | H04B 7/0413 |
| 2021/0135513 | A1 * | 5/2021 | Takizawa | ................ | H02P 25/22 |
| 2022/0128650 | A1 * | 4/2022 | Tainaka | .............. | H01Q 1/2283 |
| 2023/0395967 | A1 * | 12/2023 | Astorga | ................. | H01L 24/13 |

FOREIGN PATENT DOCUMENTS

| JP | H11-004106 A | 1/1999 |
| JP | 2008-064632 A | 3/2008 |
| JP | 2009-047309 A | 3/2009 |
| JP | 2010-206326 A | 9/2010 |
| JP | 2014-219227 A | 11/2014 |
| JP | 2021-012083 A | 2/2021 |
| KR | 10-2020-0131155 A | 11/2020 |
| WO | 2017/115494 A1 | 7/2017 |
| WO | 2021/005950 A1 | 1/2021 |

* cited by examiner

ELECTRONIC DEVICE

CROSS-REFERENCE TO RELATED APPLICATIONS

This application claims priority from Japanese Patent Application No. 2021-56002 filed in Japan on Mar. 29, 2021, the entire disclosure of which is incorporated herein by reference.

TECHNICAL FIELD

The present disclosure relates to an electronic device.

BACKGROUND OF INVENTION

For example, in fields such as automobile-related industries, a technology for measuring a distance or the like between a vehicle of interest and a predetermined object is regarded as important. Recently, various studies have been conducted particularly on a radar (Radio Detecting and Ranging) technology for measuring a distance or the like to an object such as an obstacle by transmitting a radio wave such as a millimeter wave and then receiving a reflected wave reflected off the object. Such a technology for measuring a distance or the like is expected to be more important in the future with progresses of a technology for assisting drivers in driving and an automated-driving-related technology for partially or entirely automating driving.

In a technology such as the radar described above, various proposals have been made on countermeasures against noise generated when a signal for use in detection of an object is transmitted and received. For example, Patent Literature 1 discloses a radar apparatus in which a radio frequency circuit portion is disposed at a position away from a power supply circuit portion to make noise generated from the power supply circuit portion less affect the radio frequency circuit portion. Patent Literature 2 discloses a radar apparatus in which a gap between a printed circuit board and a housing is narrowed to make it hard for noise to pass through the gap to the inside and the outside of the apparatus.

CITATION LIST

Patent Literature

Patent Literature 1: Japanese Unexamined Patent Application Publication No. 2008-64632
Patent Literature 2: Japanese Unexamined Patent Application Publication No. 2014-219227

SUMMARY

In one embodiment, an electronic device includes a transmission unit, a reception unit, a controller, a power supply device, and a substrate.

The transmission unit transmits a transmission wave from a transmission antenna.

The reception unit receives, from a reception antenna, a reflected wave that is the transmission wave having been reflected.

The controller detects an object that reflects the transmission wave, based on a transmission signal transmitted as the transmission wave and a reception signal received as the reflected wave.

The power supply device supplies electric power to at least any of the transmission unit, the reception unit, or the controller.

On the substrate, the transmission antenna, the reception antenna, the controller, and the power supply device are disposed.

The transmission antenna and the reception antenna are disposed on a first surface of the substrate.

The controller and the power supply device are disposed on a second surface of the substrate. The second surface is opposite to the first surface.

The substrate includes a waveguide configured to guide at least one of the transmission wave or the reflected wave between the first surface and the second surface.

The waveguide is covered with an electromagnetic wave shielding member that is apart from the second surface of the substrate by a distance of ¼ of a wavelength of the transmission wave or the reflected wave.

DESCRIPTION OF EMBODIMENTS

In an electronic device that detects a predetermined object by receiving a reflected wave of a transmission wave that has been transmitted and has been reflected off the object, noise is desirably reduced as much as possible when a signal for use in detection of the object is transmitted and received. The present disclosure provides an electronic device having improved countermeasures against noise generated when a signal for used in detection of an object is transmitted and received. One embodiment can provide an electronic device having improved countermeasures against noise generated when a signal for use in detection of an object is transmitted and received. One embodiment is described in detail below with reference to the drawings.

An electronic device according to one embodiment is mounted in a vehicle (mobility device) such as an automobile, for example, and thus is capable of detecting a predetermined object located around the mobility device. To this end, the electronic device according to the one embodiment is capable of transmitting a transmission wave to an area around the mobility device from a transmission antenna installed on or in the mobility device. The electronic device according to the one embodiment is also capable of receiving a reflected wave that is the reflected transmission wave, from a reception antenna installed on or in the mobility device. For example, a radar sensor or the like installed on or in the mobility device may include at least one of the transmission antenna or the reception antenna.

A typical configuration example is described below in which the electronic device according to the one embodiment is mounted in an automobile such as a passenger car. However, the mobility device in which the electronic device according to the one embodiment is mounted is not limited to an automobile. The electronic device according to the one embodiment may be mounted in various mobility devices such as a bus, a truck, a motorcycle, a bicycle, a ship, an aircraft, agricultural machinery such as a tractor, a snow-plow, a garbage truck, a police car, an ambulance, and a drone. The mobility device in which the electronic device according to the one embodiment is mounted is not neces-sarily limited to a mobility device that moves by its own motive power. For example, the mobility device in which the electronic device according to the one embodiment is mounted may be a trailer towed by a tractor. The electronic device according to the one embodiment is capable of measuring a distance or the like between a sensor and a predetermined object when at least one of the sensor or the object is movable. The electronic device according to the one embodiment is also capable of measuring a distance or the like between the sensor and the object even when both the sensor and the object are stationary.

An example of how the electronic device according to the one embodiment detects an object is described.

Figure 1:
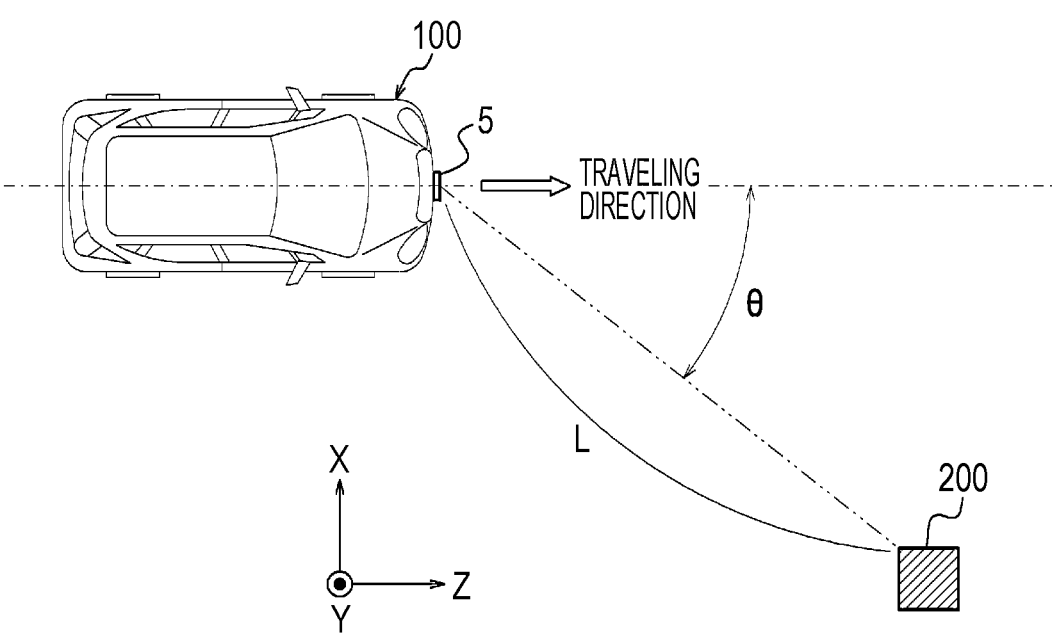
FIG. 1 is a diagram for describing how an electronic device according to one embodiment is used.

FIG. 1 is a diagram for describing how the electronic device according to the one embodiment is used. FIG. 1 illustrates an example in which a sensor, including a trans-mission antenna and a reception antenna, according to the one embodiment is installed on a mobility device.

A sensor 5, including a transmission antenna and a reception antenna, according to the one embodiment is installed on a mobility device 100 illustrated in FIG. 1. The mobility device 100 illustrated in FIG. 1 includes an elec-tronic device 1 according to the one embodiment mounted (for example, built) therein. A specific configuration of the electronic device 1 is described later. The sensor 5 may include at least one of the transmission antenna or the reception antenna, for example. The sensor 5 may appro-priately include at least any of other functional units, such as at least part of a controller 10 (FIG. 2) included in the electronic device 1. The mobility device 100 illustrated in FIG. 1 may be an automotive vehicle such as a passenger car but may be a mobility device of any type. In FIG. 1, the mobility device 100 may move (travel or slowly travel), for example, in a positive Z-axis direction (traveling direction) illustrated in FIG. 1 or in another direction, or may be stationary without moving.

As illustrated in FIG. 1, the sensor 5 including the transmission antenna is installed on the mobility device 100. In the example illustrated in FIG. 1, only one sensor 5 including the transmission antenna and the reception antenna is installed at a front portion of the mobility device 100. The position where the sensor 5 is installed on the mobility device 100 is not limited to the position illustrated in FIG. 1 and may be another appropriate position. For example, the sensor 5 illustrated in FIG. 1 may be installed on a left side, on a right side, and/or at a rear portion of the mobility device 100. The number of such sensors 5 may be any number equal to or greater than 1 depending on various conditions (or requirements) such as a range and/or an accuracy of measurement performed at the mobility device 100. The sensor 5 may be installed inside the mobility device 100. The inside the mobility device 100 may be, for example, a space inside a bumper, a space inside a body, a space inside a headlight, or a space such as a driver's space.

The sensor 5 transmits an electromagnetic wave as a transmission wave from the transmission antenna. For example, when a predetermined object (for example, an object 200 illustrated in FIG. 1) is located around the mobility device 100, at least part of the transmission wave transmitted from the sensor 5 is reflected off the object to become a reflected wave. For example, the reception antenna of the sensor 5 receives such a reflected wave. In this manner, the electronic device 1 mounted in the mobility device 100 can detect the object.

The sensor 5 including the transmission antenna may be typically a radar (Radio Detecting and Ranging) sensor that transmits and receives a radio wave. However, the sensor 5 is not limited to a radar sensor. The sensor 5 according to the one embodiment may be, for example, a sensor based on the LIDAR (Light Detection and Ranging, Laser Imaging Detection and Ranging) technology that uses an optical wave. Each of these sensors can include, for example, a patch antenna. Since the technologies such as the radar and the LIDAR are already known, detailed description may be appropriately simplified or omitted.

The electronic device 1 mounted in the mobility device 100 illustrated in FIG. 1 receives, from the reception antenna, the reflected wave of the transmission wave trans-mitted from the transmission antenna of the sensor 5. In this manner, the electronic device 1 can detect the predetermined object 200 located within a predetermined distance from the mobility device 100. For example, as illustrated in FIG. 1, the electronic device 1 can measure a distance L between the mobility device 100, which is a vehicle of interest, and the predetermined object 200. The electronic device 1 can also measure a relative velocity between the mobility device 100, which is the vehicle of interest, and the predetermined object 200. The electronic device 1 can further measure a direction (an angle of arrival $\theta$) from which the reflected wave from the predetermined object 200 arrives at the mobility device 100, which is the vehicle of interest.

The object 200 may be, for example, at least any of an oncoming automobile traveling in a lane adjacent to a lane of the mobility device 100, an automobile traveling next to the mobility device 100, an automobile traveling in front of or behind the mobility device 100 in the same lane, and the like. The object 200 may also be any object located around the mobility device 100, such as a motorcycle, a bicycle, a stroller, a person such as a pedestrian, an animal, other forms of life such as an insect, a guardrail, a median strip, a road sign, a step on a sidewalk, a wall, or an obstacle. The object 200 may be in motion or stationary. For example, the object 200 may be an automobile or the like that is parked or stationary around the mobility device 100.

In FIG. 1, a ratio between a size of the sensor 5 and a size of the mobility device 100 does not necessarily indicate an actual ratio. FIG. 1 illustrates the sensor 5 that is installed at an outer portion of the mobility device 100. However, in one embodiment, the sensor 5 may be installed at various positions of the mobility device 100. For example, in one embodiment, the sensor 5 may be installed inside the bum-per of the mobility device 100 so as not to appear on the external appearance of the mobility device 100.

A typical example is described below in which the trans-mission antenna of the sensor 5 transmits a radio wave in a frequency band, such as a millimeter wave (equal to or higher than 30 GHz) or a quasi-millimeter wave (for example, around 20 GHz to 30 GHz). For example, the transmission antenna of the sensor 5 may transmit a radio wave having a frequency bandwidth of 4 GHz such as from 77 GHz to 81 GHz.

Figure 2:
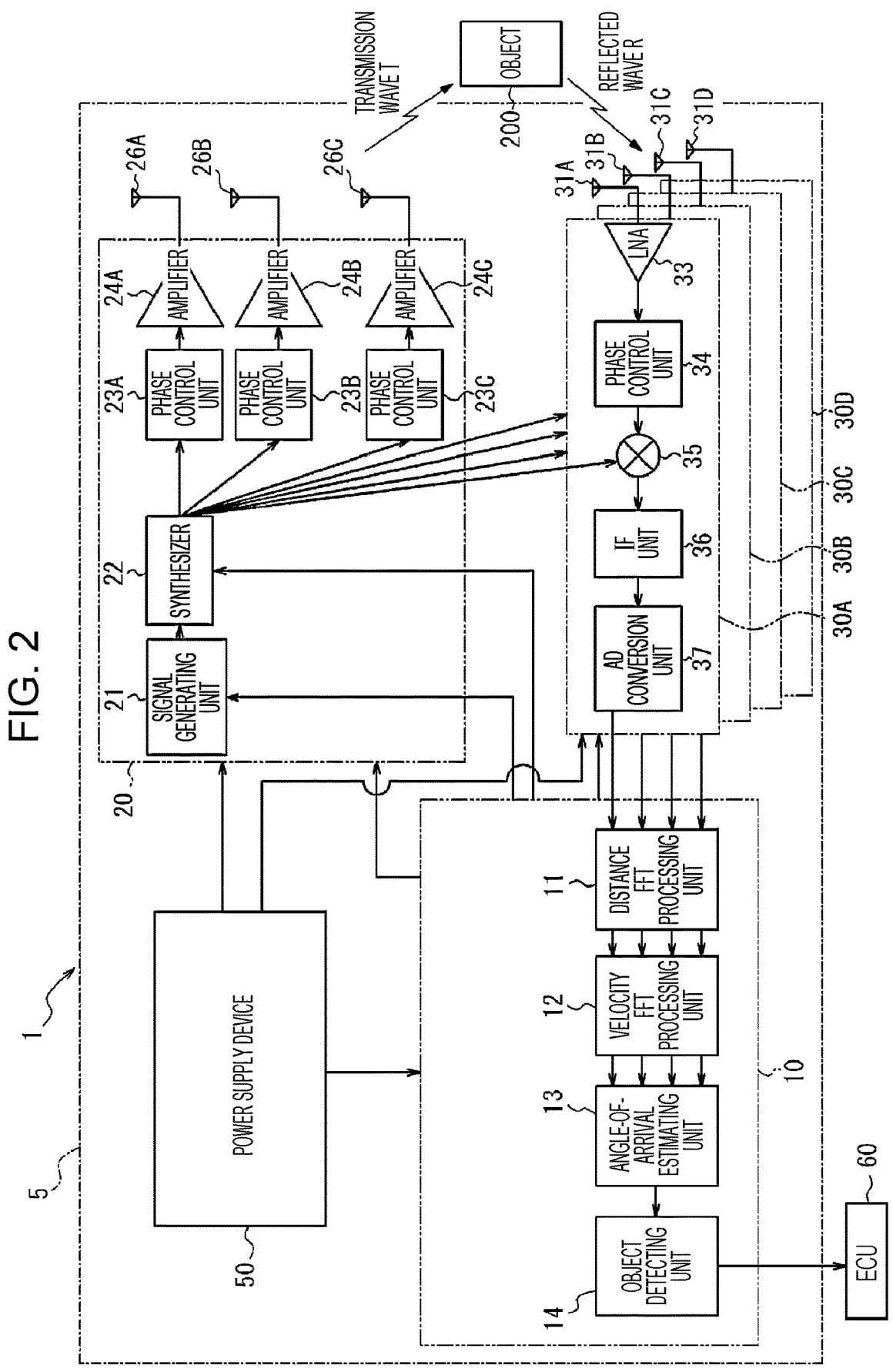
FIG. 2 is a functional block diagram schematically illustrating a configuration of the electronic device according to the one embodiment.

FIG. 2 is a functional block diagram schematically illustrating an example of a configuration of the electronic device 1 according to the one embodiment. An example of the configuration of the electronic device 1 according to the one embodiment is described below.

When a distance or the like is measured by using a millimeter-wave radar, a frequency-modulated continuous wave radar (hereinafter, referred to as an FMCW radar) is often used. The FMCW radar sweeps a frequency of a to-be-transmitted radio wave to generate a transmission signal. Thus, a frequency of the radio wave used by such a millimeter-wave FMCW radar, which uses a radio wave of a frequency band of 79 GHz, for example, has a frequency bandwidth of 4 GHz such as from 77 GHz to 81 GHz, for example. The radar of the frequency band of 79 GHz has a feature that a usable frequency bandwidth is wider than other millimeter-wave and/or quasi-millimeter-wave radars of frequency bands of 24 GHz, 60 GHz, and 76 GHz, for example. Such an embodiment is described below.

As illustrated in FIG. 2, the electronic device 1 according to the one embodiment includes the sensor 5 and an ECU (Electronic Control Unit) 50. The ECU 60 controls various operations of the mobility device 100. The ECU 60 may include at least one or more ECUs. In the present disclosure, the "electronic device" may mean, for example, the electronic device 1 illustrated in FIG. 2 (that is, including the sensor 5 and the ECU 60, for example) or may mean, for example, the sensor 5 illustrated in FIG. 2.

The electronic device 1 according to the one embodiment includes the controller 10. The electronic device 1 according to the one embodiment may also appropriately include another functional unit such as at least any of a transmission unit 20 or reception units 30A to 30D. As illustrated in FIG. 2, the electronic device 1 may include multiple reception units such as the reception units 30A to 30D. When the reception units 30A, 30B, 30C, and 30D are not particularly distinguished from one another, the reception units 30A, 30B, 30C, and 30D are simply referred to as "reception units 30" below. As illustrated in FIG. 2, the electronic device 1 according to the one embodiment may include a power supply device 50. As illustrated in FIG. 2, the sensor 5 according to the one embodiment may include the power supply device 50.

The controller 10 may include a distance FFT processing unit 11, a velocity FFT processing unit 12, an angle-of-arrival estimating unit 13, and an object detecting unit 14. These functional units included in the controller 10 are further described later.

As illustrated in FIG. 2, the transmission unit 20 may include a signal generating unit 21, a synthesizer 22, phase control units 23A, 23B, and 23C, amplifiers 24A, 24B, and 24C, and transmission antennas 26A, 26B, and 26C. When the phase control units 23A, 23B, and 23C are not distinguished from one another, the phase control units 23A, 23B, and 23C are simply referred to as "phase control units 23" below. When the amplifiers 24A, 24B, and 24C are not distinguished from one another, the amplifiers 24A, 24B, and 24C are simply referred to as "amplifiers 24" below. When the transmission antennas 26A, 26B, and 26C are not distinguished from one another, the transmission antennas 26A, 26B, and 26C are simply referred to as "transmission antennas 26" below.

As illustrated in FIG. 2, each of the reception units 30 may include a respective one of reception antennas 31A to 31D.

When the reception antennas 31A, 31B, 31C, and 31D are not distinguished from one another, the reception antennas 31A, 31B, 31C, and 31D are simply referred to as "reception antennas 31" below. As illustrated in FIG. 2, each of the multiple reception units 30 may include an LNA 33, a phase control unit 34, a mixer 35, an IF unit 36, and an AD conversion unit 37. The reception units 30A to 30D may have the same and/or similar configuration. FIG. 2 schematically illustrates the configuration of only the reception unit 30A as a representative example.

The sensor 5 described above may include, for example, the transmission antennas 26 and the reception antennas 31. The sensor 5 may also appropriately include at least any of other functional units such as the controller 10.

The controller 10 included in the electronic device 1 according to the one embodiment is capable of controlling the individual functional units of the electronic device 1 and controlling operations of the entire electronic device 1. To provide control and processing capabilities for executing various functions, the controller 10 may include at least one processor, for example, a CPU (Central Processing Unit) or a DSP (Digital Signal Processor). The controller 10 may be collectively implemented by one processor, may be implemented by some processors, or may be implemented by discrete individual processors. The processor may be implemented as one integrated circuit. The integrated circuit is also referred to as an IC. The processor may be implemented as multiple integrated circuits and discrete circuits connected to be able to perform communication. The processor may be implemented based on various other known technologies. In the one embodiment, the controller 10 may be configured as, for example, a CPU and a program executed by the CPU. The controller 10 may include a memory of any type as appropriate. In the one embodiment, the memory of any type may store various parameters for setting a range in which an object is detected based on a transmission wave T transmitted from each transmission antenna 26 and a reflected wave R received from each reception antenna 31.

In the electronic device 1 according to the one embodiment, the controller 10 is capable of controlling at least one of the transmission unit 20 or the reception units 30. In this case, the controller 10 may control at least one of the transmission unit 20 or the reception units 30, based on various kinds of information stored in the memory of any type, for example. In the electronic device 1 according to the one embodiment, the controller 10 may instruct the signal generating unit 21 to generate a signal or may control the signal generating unit 21 to generate a signal.

In accordance with control performed by the controller 10, the signal generating unit 21 generates a signal (transmission signal) to be transmitted as the transmission wave T from each of the transmission antennas 26. When generating a transmission signal, the signal generating unit 21 may allocate a frequency of the transmission signal in accordance with control performed by the controller 10, for example. Specifically, the signal generating unit 21 may allocate the frequency of the transmission signal in accordance with a parameter set by the controller 10. For example, the signal generating unit 21 receives frequency information from the controller 10 and generates a signal having a predetermined frequency in a frequency band such as from 77 GHz to 81 GHz, for example. The signal generating unit 21 may include a functional unit such as a voltage control oscillator (VCO), for example.

The signal generating unit 21 may be configured as hardware having the function, for example as a microcomputer, or for example as a processor such as a CPU and a program or the like executed by the processor. Each functional unit described below may also be configured as hardware having the function, for example as a microcomputer if possible, or for example as a processor such as a CPU and a program or the like executed by the processor if possible.

In the electronic device 1 according to the one embodiment, the signal generating unit 21 may generate a transmission signal (transmission chirp signal) such as a chirp signal, for example. In particular, the signal generating unit 21 may generate a signal (linear chirp signal) whose frequency changes linearly and periodically. For example, the signal generating unit 21 may generate a chirp signal whose frequency linearly and periodically increases from 77 GHz to 81 GHz as time elapses. For example, the signal generating unit 21 may generate a signal whose frequency periodically repeats a linear increase (up-chirp) from 77 GHz to 81 GHz and a decrease (down-chirp) as time elapses. For example, the controller 10 may set in advance the signal generated by the signal generating unit 21. For example, the memory of any type or the like may store in advance the signal generated by the signal generating unit 21. Since a chirp signal used in a technical field such as the radar is known, more detailed description is appropriately simplified or omitted. The signal generated by the signal generating unit 21 is supplied to the synthesizer 22.

Figure 3:
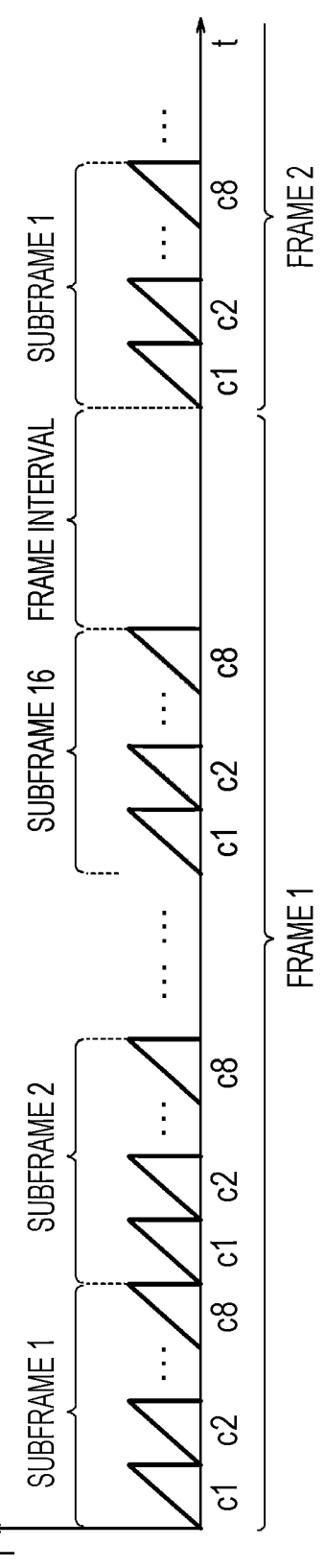
FIG. 3 is a diagram for describing a structure of a transmission signal according to the one embodiment.

FIG. 3 is a diagram for describing an example of chirp signals generated by the signal generating unit 21.

In FIG. 3, the horizontal axis represents elapsed time, and the vertical axis represents a frequency. In the example illustrated in FIG. 3, the signal generating unit 21 generates linear chirp signals whose frequency changes linearly and periodically. FIG. 3 illustrates chirp signals $c1, c2, \ldots, c8$. As illustrated in FIG. 3, the frequency of each chirp signal linearly increases as time elapses.

In the example illustrated in FIG. 3, one subframe includes eight chirp signals $c1, c2, \ldots, c8$. That is, each of subframes such as a subframe 1 and a subframe 2 illustrated in FIG. 3 includes eight chirp signals $c1, c2, \ldots, c8$. In the example illustrated in FIG. 3, one frame includes 16 subframes such as the subframes 1 to 16. That is, each of frames such as a frame 1 and a frame 2 illustrated in FIG. 3 includes 16 subframes. As illustrated in FIG. 3, a frame interval of a predetermined length may be included between frames. Each single frame illustrated in FIG. 3 may have a length of about 30 ms to 50 ms, for example.

In FIG. 3, the frame 2 and subsequent frames may have the same and/or similar configuration. In FIG. 3, the frame 3 and subsequent frames may have the same and/or similar configuration. In the electronic device 1 according to the one embodiment, the signal generating unit 21 may generate a transmission signal as any number of frames. In FIG. 3, an illustration of some chirp signals is omitted. As described above, for example, the memory of any type or the like may store a relationship between time and a frequency of the transmission signal generated by the signal generating unit 21.

As described above, the electronic device 1 according to the one embodiment may transmit a transmission signal made up of subframes each including multiple chirp signals. The electronic device 1 according to the one embodiment may transmit a transmission signal made up of frames each including a predetermined number of subframes.

In the description below, the electronic device 1 transmits a transmission signal having the frame structure illustrated in FIG. 3. However, the frame structure illustrated in FIG. 3 is an example. For example, the number of chirp signals included in one subframe is not limited to eight. In one embodiment, the signal generating unit 21 may generate a subframe including any number of (for example, multiple) chirp signals. The subframe structure illustrated in FIG. 3 is also an example. For example, the number of subframes included in one frame is not limited to 16. In one embodiment, the signal generating unit 21 may generate a frame including any number of (for example, multiple) subframes. The signal generating unit 21 may generate signals having different frequencies. The signal generating unit 21 may generate multiple discrete signals of bandwidths in which frequencies f are different from each other.

Referring back to FIG. 2, the synthesizer 22 increases the frequency of the signal generated by the signal generating unit 21 to a frequency in a predetermined frequency band. The synthesizer 22 may increase the frequency of the signal generated by the signal generating unit 21 to a frequency selected as a frequency of the transmission wave T to be transmitted from each of the transmission antennas 26. For example, the controller 10 may set the frequency selected as the frequency of the transmission wave T to be transmitted from each of the transmission antennas 26. For example, the frequency selected as the frequency of the transmission wave T to be transmitted from each of the transmission antennas 26 may be a frequency selected by the controller 10. For example, the memory of any type may store the frequency selected as the frequency of the transmission wave T to be transmitted from each of the transmission antennas 26. The signal whose frequency has been increased by the synthesizer 22 is supplied to the phase control unit 23 and the mixer 35. When the multiple phase control units 23 are present, the signal whose frequency has been increased by the synthesizer 22 may be supplied to each of the multiple phase control units 23. When the multiple reception units 30 are present, the signal whose frequency has been increased by the synthesizer 22 may be supplied to the mixer 35 of each of the multiple reception units 30.

Each of the phase control units 23 controls (adjusts) a phase of the transmission signal supplied from the synthesizer 22. Specifically, for example, in accordance with control performed by the controller 10, each of the phase control units 23 may appropriately advance or delay the phase of the signal supplied from the synthesizer 22 to adjust the phase of the transmission signal. In this case, based on a difference between paths of the transmission waves T to be transmitted from the multiple transmission antennas 26, the phase control units 23 may adjust the phases of the respective transmission signals. The phase control units 23 appropriately adjust the phases of the respective transmission signals, so that the transmission waves T transmitted from the multiple transmission antennas 26 enhance with one another in a predetermined direction to form a beam (beamforming). In this case, for example, the memory of any type may store a correlation between a direction of beamforming and amounts of phase by which the respective transmission signals to be transmitted by the multiple transmission antennas 26 are to be controlled. Each of the phase control units 23 may include, for example, a phase shifter of any type. The transmission signal whose phase is controlled by each of the phase control units 23 is supplied to a respective one of the amplifiers 24.

The amplifier 24 amplifies power (electric power) of the transmission signal supplied from the phase control unit 23 in accordance with control performed by the controller 10, for example. When the sensor 5 includes the multiple transmission antennas 26, each of the multiple amplifiers 24 may amplify power (electric power) of the transmission signal supplied from a respective one of the multiple phase control units 23 in accordance with control performed by the controller 10, for example. Since the technology for amplifying power of a transmission signal is already known, more detailed description is omitted. The amplifier 24 is connected to the transmission antenna 26.

The transmission antenna 26 outputs (transmits), as the transmission wave T, the transmission signal amplified by the amplifier 24. When the sensor 5 includes the multiple transmission antennas 26, each of the multiple transmission antennas 26 may output (transmit), as the transmission wave T, the transmission signal amplified by a respective one of the multiple amplifiers 24. Since the transmission antennas 26 can have a configuration that is the same as and/or similar to the configuration of transmission antennas for use in the known radar technology, more detailed description is omitted.

Accordingly, the electronic device 1 according to the one embodiment, which includes the transmission antennas 26, can transmit transmission signals (for example, transmission chirp signals) as the transmission waves T from the respective transmission antennas 26. At least one of the functional units of the electronic device 1 may be housed in one housing. In this case, the one housing may have a hard-to-open structure. For example, the transmission antennas 26, the reception antennas 31, and the amplifiers 24 are desirably housed in one housing, and this housing desirably has a hard-to-open structure. When the sensor 5 is installed on the mobility device 100 such as an automobile, each of the transmission antennas 26 may transmit the transmission wave T to outside the mobility device 100 through a cover member such as a radar cover, for example. In this case, the radar cover may be made of a material, for example, a synthetic resin or rubber, that allows an electromagnetic wave to pass therethrough. This radar cover may also serve as a housing of the sensor 5, for example. Covering the transmission antennas 26 with a member such as the radar cover can reduce a risk of the transmission antennas 26 being damaged or malfunctioning because of a contact with an external object. The radar cover and the housing may also be referred to as a radome.

FIG. 2 illustrates an example of the electronic device 1 that includes three transmission antennas 26. However, in one embodiment, the electronic device 1 may include any number of transmission antennas 26. On the other hand, in one embodiment, the electronic device 1 may include the multiple transmission antennas 26 when the transmission waves T transmitted from the respective transmission antennas 26 form a beam in a predetermined direction. In the one embodiment, the electronic device 1 may include the multiple phase control units 23 and the multiple amplifiers 24 to correspond to the multiple transmission antennas 26. Each of the multiple phase control units 23 may control the phase of a respective one of the multiple transmission waves supplied from the synthesizer 22 and to be transmitted from the respective transmission antennas 26. Each of the multiple amplifiers 24 may amplify power of a respective one of the multiple transmission signals to be transmitted from the respective transmission antennas 26. In this case, the sensor 5 may include the multiple transmission antennas. As described above, when the electronic device 1 illustrated FIG. 2 includes the multiple transmission antennas 26, the electronic device 1 may include multiple functional units necessary for transmitting the transmission waves T from the multiple transmission antennas 26.

The reception antenna 31 receives the reflected wave R. The reflected wave R is the transmission wave T reflected off the predetermined object 200. As the reception antenna 31, multiple antennas such as the reception antennas 31A to 31D, for example, may be included. Since the reception antennas 31 can have a configuration that is the same as and/or similar to the configuration of reception antennas for use in the known radar technology, more detailed description is omitted. The reception antenna 31 is connected to the LNA 33. A reception signal based on the reflected wave R received by the reception antenna 31 is supplied to the LNA 33.

The electronic device 1 according to the one embodiment can receive, from each of the multiple reception antennas 31, the reflected wave R that is the transmission wave T that has been transmitted as the transmission signal (transmission chirp signal) such as a chirp signal, for example, and has been reflected off the predetermined object 200. When the transmission chirp signal is transmitted as the transmission wave T in this manner, the reception signal based on the received reflected wave R is referred to as a reception chirp signal. That is, the electronic device 1 receives the reception signal (for example, the reception chirp signal) as the reflected wave R from each of the reception antennas 31. When the sensor 5 is installed on the mobility device 100 such as an automobile, each of the reception antennas 31 may receive the reflected wave R from outside the mobility device 100 through a cover member such as a radar cover, for example. In this case, the radar cover may be made of a material, for example, a synthetic resin or rubber, that allows an electromagnetic wave to pass therethrough. This radar cover may also serve as a housing of the sensor 5, for example. Covering the reception antennas 31 with a member such as the radar cover can reduce a risk of the reception antennas 31 being damaged or malfunctioning because of a contact with an external object. The radar cover and the housing may also be referred to as a radome.

When the reception antenna 31 is installed near the transmission antenna 26, these reception antenna 31 and transmission antenna 26 may be collectively included in one sensor 5. That is, for example, the one sensor 5 may include at least one transmission antenna 26 and at least one reception antenna 31. For example, the one sensor 5 may include the multiple transmission antennas 26 and the multiple reception antennas 31. In such a case, one radar sensor may be covered with a cover member such as one radar cover, for example.

The LNA 33 amplifies, with low noise, the reception signal based on the reflected wave R received by the reception antenna 31. The LNA 33 may be a low-noise amplifier and amplifies, with low noise, the reception signal supplied from the reception antenna 31. The reception signal amplified by the LNA 33 is supplied to the phase control unit 34.

The phase control unit 34 controls (adjusts) a phase of the reception signal supplied from the LNA 33. Specifically, for example, in accordance with control performed by the controller 10, the phase control unit 34 may appropriately advance or delay the phase of the signal supplied from the LNA 33 to adjust the phase of the reception signal. In this case, based on a difference between paths of the reflected waves R received from the multiple reception antennas 31, the phase control units 34 may adjust the phases of the respective reception signals. In this case, for example, the memory of any type may store amounts of phase by which the respective reception signals received from the multiple reception antennas 31 are to be controlled. The phase control unit 34 may include, for example, a phase shifter of any type.

The transmission signal whose phase has been controlled by the phase control unit 34 is supplied to the mixer 35.

The mixer 35 mixes (multiplies) the reception signal having a radio frequency (RF) and supplied from the phase control unit 34 and the transmission signal supplied from the synthesizer 22 to generate a beat signal. The beat signal obtained by the mixer 35 through mixing is supplied to the IF unit 36.

The IF unit 36 performs frequency conversion on the beat signal supplied from the mixer 35 to decrease the frequency of the beat signal to an intermediate frequency (IF). The beat signal whose frequency has been decreased by the IF unit 36 is supplied to the AD conversion unit 37.

The AD conversion unit 37 digitizes the analog beat signal supplied from the IF unit 36. The AD conversion unit 37 may be configured as an analog-to-digital conversion circuit (Analog-to-Digital Converter (ADC)) of any type. The digitized beat signal obtained by the AD conversion unit 37 is supplied to the distance FFT processing unit 11 of the controller 10. When the multiple reception units 30 are present, the digitized beat signals obtained by the respective AD conversion units 37 may be supplied to the distance FFT processing unit 11.

The distance FFT processing unit 11 estimates a distance between the mobility device 100 equipped with the electronic device 1 and the object 200, based on the beat signals supplied from the respective AD conversion units 37. The distance FFT processing unit 11 may include a processing unit that performs fast Fourier transform, for example. In this case, the distance FFT processing unit 11 may be configured as a circuit, chip, or the like of any type that performs fast Fourier transform (FFT).

The distance FFT processing unit 11 performs FFT processing (hereinafter, appropriately referred to as "distance FFT processing") on the digitized beat signals obtained by the AD conversion units 37. For example, the distance FFT processing unit 11 may perform FFT processing on complex signals supplied from the AD conversion units 37. The digitized beat signals obtained by the AD conversion units 37 can be represented as temporal changes in signal intensity (power). The distance FFT processing unit 11 performs FFT processing on such beat signals, so that the beat signals can be represented as a signal intensity (power) for each frequency. If a peak in a result obtained by the distance FFT processing is equal to or greater than a predetermined threshold, the distance FFT processing unit 11 may determine that the predetermined object 200 is located at the distance corresponding to the peak. For example, a method for determining that an object (reflecting object) that reflects a transmission wave is present when a peak value that is equal to or greater than a threshold is detected from the average power or amplitude of a disturbance signal, such as a constant false alarm rate (CFAR) detection process, is known.

As described above, the electronic device 1 according to the one embodiment can detect the object 200 that reflects the transmission wave T, based on the transmission signal transmitted as the transmission wave T and the reception signal received as the reflected wave R.

The distance FFT processing unit 11 can estimate a distance to a predetermined object, based on one chirp signal (for example, c1 illustrated in FIG. 3). That is, the electronic device 1 can measure (estimate) the distance L illustrated in FIG. 1 by performing the distance FFT processing. Since a technique for measuring (estimating) a distance to a predetermined object by performing FFT processing on a beat signal is known, more detailed description is appropriately simplified or omitted. The result (for example, distance information) of the distance FFT processing performed by the distance FFT processing unit 11 may be supplied to the velocity FFT processing unit 12. The result of the distance FFT processing performed by the distance FFT processing unit 11 may also be supplied to the object detecting unit 14.

The velocity FFT processing unit 12 estimates a relative velocity between the mobility device 100 equipped with the electronic device 1 and the object 200, based on the beat signals on which the distance FFT processing has been performed by the distance FFT processing unit 11. The velocity FFT processing unit 12 may include a processing unit that performs fast Fourier transform, for example. In this case, the velocity FFT processing unit 12 may be configured as a circuit, chip, or the like of any type that performs fast Fourier transform (FFT).

The velocity FFT processing unit 12 further performs FFT processing (hereinafter, appropriately referred to as "velocity FFT processing") on the beat signals on which the distance FFT processing unit 11 has performed the distance FFT processing. For example, the velocity FFT processing unit 12 may perform FFT processing on the complex signals supplied from the distance FFT processing unit 11. The velocity FFT processing unit 12 can estimate a relative velocity of the predetermined object, based on a subframe (for example, the subframe 1 illustrated in FIG. 3) including chirp signals. When the distance FFT processing is performed on the beat signal in the above-described manner, multiple vectors can be generated. The velocity FFT processing unit 12 can estimate a relative velocity to the predetermined object by determining a phase of a peak in a result of the velocity FFT processing performed on these multiple vectors. That is, the electronic device 1 can measure (estimate) a relative velocity between the mobility device 100 and the predetermined object 200 illustrated in FIG. 1 by performing the velocity FFT processing. Since a technique for measuring (estimating) a relative velocity to a predetermined object by performing velocity FFT processing on a result of distance FFT processing is known, more detailed description is appropriately simplified or omitted. The result (for example, velocity information) of the velocity FFT processing performed by the velocity FFT processing unit 12 may be supplied to the angle-of-arrival estimating unit 13. The result of the velocity FFT processing performed by the velocity FFT processing unit 12 may also be supplied to the object detecting unit 14.

The angle-of-arrival estimating unit 13 estimates a direction from which the reflected wave R arrives from the predetermined object 200, based on the result of the velocity FFT processing performed by the velocity FFT processing unit 12. The electronic device 1 can estimate the direction from which the reflected wave R arrives, by receiving the reflected wave R from the multiple reception antennas 31. For example, the multiple reception antennas 31 are arranged at a predetermined interval. In this case, the transmission wave T transmitted from the transmission antenna 26 is reflected off the predetermined object 200 to become the reflected wave R. Each of the multiple reception antennas 31 arranged at the predetermined interval receives the reflected wave R. The angle-of-arrival estimating unit 13 can estimate the direction from which the reflected wave R arrives at each of the multiple reception antennas 31, based on the phase of the reflected wave R received by the reception antenna 31 and a difference in path of the reflected wave R. That is, the electronic device 1 can measure (estimate) the angle of arrival θ illustrated in FIG. 1, based on the result of the velocity FFT processing.

Various techniques for estimating a direction from which the reflected wave R arrives, based on a result of velocity FFT processing have been proposed. For example, MUSIC (MUltiple SIgnal Classification), ESPRIT (Estimation of Signal Parameters via Rotational Invariance Technique), and the like are known direction-of-arrival estimation algorithms. Thus, more detailed description of the known techniques is appropriately simplified or omitted. Information (angle information) of the angle of arrival θ estimated by the angle-of-arrival estimating unit 13 may be supplied to the object detecting unit 14.

The object detecting unit 14 detects an object located in a range in which the transmission waves T are transmitted, based on the information supplied from at least any of the distance FFT processing unit 11, the velocity FFT processing unit 12, or the angle-of-arrival estimating unit 13. The object detecting unit 14 may perform detection of an object by performing, for example, clustering processing based on the supplied distance information, velocity information, and angle information. For example, DBSCAN (Density-based spatial clustering of applications with noise) or the like is a known algorithm used in clustering of data. In the clustering processing, for example, average power of points constituting the detected object may be calculated. The distance information, the velocity information, the angle information, and the power information of the object detected by the object detecting unit 14 may be supplied to the ECU 60. In this case, when the mobility device 100 is an automobile, communication may be performed using a communication interface such as a CAN (Controller Area Network), for example.

The controller 10 sets various parameters that define a transmission signal and a reception signal with which an object that reflects the transmission wave T as the reflected wave R is to be detected. That is, the controller 10 may set various parameters for transmitting the transmission wave T from the transmission antenna 26 and various parameters for receiving the reflected wave R from the reception antenna 31.

In particular, in the one embodiment, the controller 10 may set various parameters related to transmission of the transmission wave T and reception of the reflected wave R in order to detect an object. For example, the controller 10 may define a range or the like in which the reflected wave R is desirably received in order to detect the object located in an object detection range by receiving the reflected wave R. For example, the controller 10 may define a range or the like to which a beam of the transmission waves T is desirably directed in order to detect an object located in the object detection range by transmitting the transmission waves T from the multiple transmission antennas 26. The controller 10 may also set various parameters for transmitting the transmission wave T and receiving the reflected wave R.

The various parameters set by the controller 10 may be supplied to the signal generating unit 21. Thus, the signal generating unit 21 can generate the transmission signal to be transmitted as the transmission waves T, based on the various parameters set by the controller 10. The various parameters set by the controller 10 may be supplied to the object detecting unit 14. Thus, the object detecting unit 14 can perform object detection processing in the object detection range determined based on the various parameters set by the controller 10.

The power supply device 50 may be any member having a function of supplying electric power to the functional units illustrated in FIG. 2. Specifically, the power supply device 50 may supply electric power to at least any of the transmission unit 20, the reception units 30, or the controller 10 as illustrated in FIG. 2, for example. In one embodiment, the power supply device 50 may include, for example, a switching power supply. The power supply device 50 may include, for example, a DC/DC converter that functions as a switching regulator. In one embodiment, the power supply device 50 may include, for example, a low dropout (LDO) regulator.

The ECU 60 included in the electronic device 1 according to the one embodiment is capable of controlling functional units of the mobility device 100 and controlling operations of the entire mobility device 100. To provide control and processing capabilities for executing various functions, the ECU 60 may include at least one processor, for example, a CPU (Central Processing Unit) or a DSP (Digital Signal Processor). The ECU 60 may be collectively implemented by one processor, may be implemented by some processors, or may be implemented by discrete individual processors. The processor may be implemented as one integrated circuit. The integrated circuit is also referred to as an IC. The processor may be implemented as multiple integrated circuits and discrete circuits connected to be able to perform communication. The processor may be implemented based on various other known technologies. In one embodiment, the ECU 60 may be configured as, for example, a CPU and a program executed by the CPU. The ECU 60 may appropriately include a memory necessary for operations of the ECU 60. At least part of the functions of the controller 10 may be functions of the ECU 60, or at least part of the functions of the ECU 60 may be functions of the controller 10.

The electronic device 1 illustrated in FIG. 2 includes the three transmission antennas 26 and the four reception antennas 31. However, the electronic device 1 according to the one embodiment may include any number of (multiple) transmission antennas 26 and any number of (multiple) reception antennas 31. As described above, the electronic device 1 according to the one embodiment may include the multiple transmission antennas 26 that transmit respective transmission waves, and the multiple reception antennas 31 that receive respective reflected waves that are the reflected transmission waves. For example, when the electronic device 1 includes the two transmission antennas 26 and the four reception antennas 31, the electronic device 1 can be regarded to include a virtual antenna array virtually including eight antennas. As described above, the electronic device 1 may receive the reflected wave R of 16 subframes illustrated in FIG. 3 by using, for example, the eight virtual antennas.

The configuration of the sensor 5 included in the electronic device 1 according to the one embodiment is further described. The sensor 5 according to the one embodiment has improved countermeasures against noise generated when a signal for use in detection of an object is transmitted and received. Thus, the sensor 5 according to the one embodiment is described mainly in terms of content related to the noise countermeasures, and the other general content is appropriately simplified or omitted.

Figure 4:
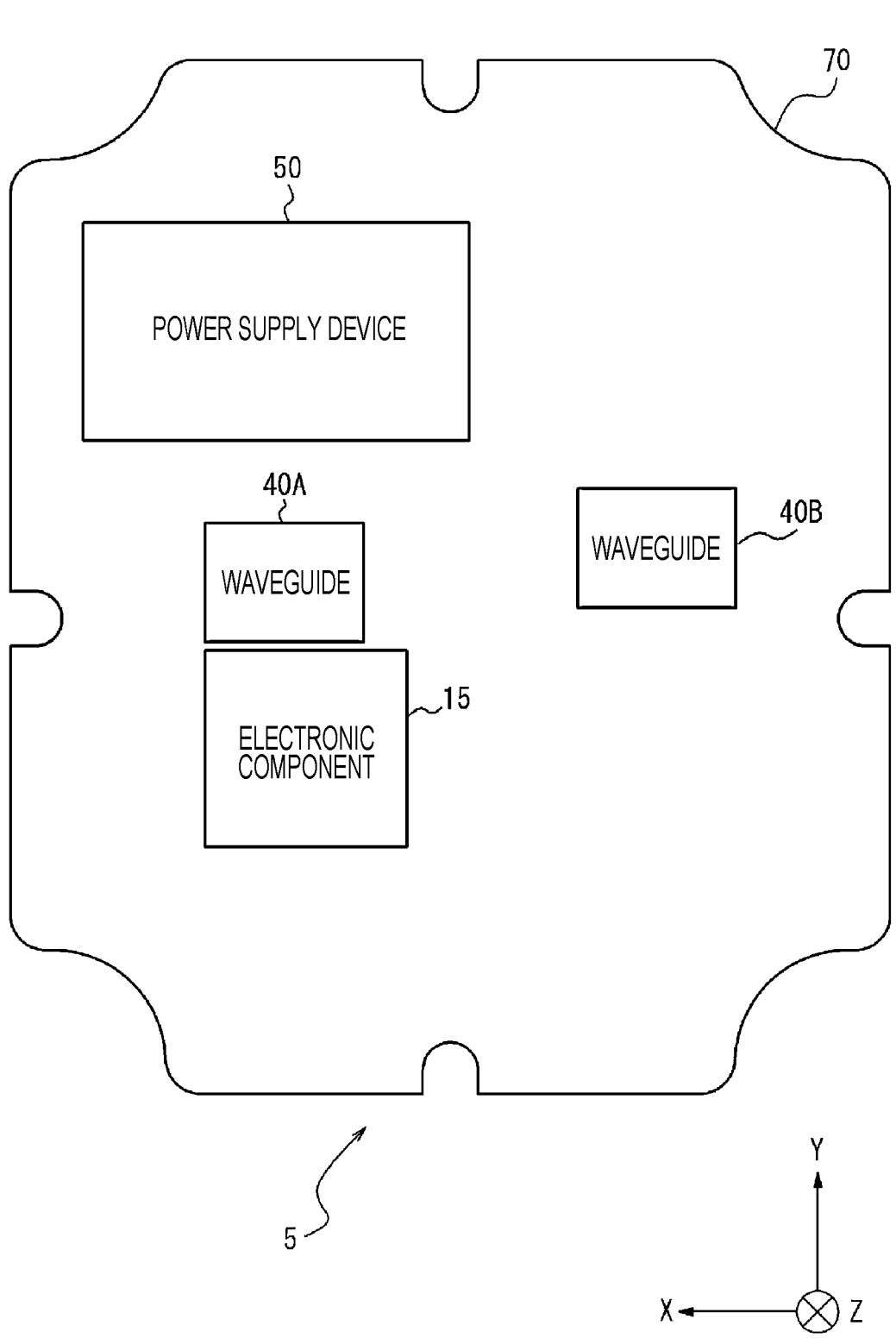
FIG. 4 is a diagram illustrating an example of functional units disposed on a substrate of the electronic device according to the one embodiment.

FIG. 4 is a diagram illustrating an example of an arrangement in which functional units are mounted on a substrate of the sensor 5 according to the one embodiment.

As illustrated in FIG. 4, in the sensor 5 according to the one embodiment, an electronic component and the like that implement various functions are mounted on a substrate 70. The substrate 70 has a first surface 71 facing in the positive Z-axis direction illustrated in FIG. 4 and a second surface opposite to the first surface 71, that is, facing in the negative Z-axis direction. FIG. 4 illustrates the substrate such that the second surface 72 of the substrate 70 is visible.

For example, the transmission antennas 26 and the reception antennas 31 illustrated in FIG. 2 may be disposed on a surface opposite to the second surface 72 of the substrate 70 illustrated in FIG. 4, that is, on the first surface 71 of the substrate 70. On the other hand, an electronic component 15 and the power supply device 50 may be disposed on the second surface 72 of the substrate 70 as illustrated in FIG. 4. The power supply device 50 illustrated in FIG. 4 may be a functional unit corresponding to the power supply device 50 described in FIG. 2.

The electronic component 15 illustrated in FIG. 4 may be a functional unit including the controller 10 described in FIG. 2. The electronic component 15 illustrated in FIG. 4 may include at least one of the transmission unit 20 or the reception units 30 illustrated in FIG. 2. Description is given of the electronic component 15, illustrated in FIG. 4, including the controller 10, the transmission unit 20, and the reception units 30 illustrated in FIG. 2. As described in FIG. 2, the controller 10 detects an object that reflects a transmission wave, based on a transmission signal transmitted as the transmission wave and a reception signal received as a reflected wave. As described in FIG. 2, the transmission unit 20 transmits a transmission wave from each of the transmission antennas 26. As described in FIG. 2, each of the reception units 30 receives a reflected wave that is the transmission wave having been reflected, from a respective one of the reception antennas 31.

As described above, in the sensor 5 according to the one embodiment, the transmission antennas 26, the reception antennas 31, the controller 10, and the power supply device 50 are disposed on the substrate 70. The transmission antennas 26 and the reception antennas 31 may be disposed on the first surface 71 of the substrate 70. The controller 10 and the power supply device 50 may be disposed on the second surface 72 of the substrate 70. As described above, in the sensor 5 according to the one embodiment, the transmission unit 20 and the reception units 30 may be disposed on the second surface 72 of the substrate 70.

As illustrated in FIG. 4, for example, waveguides 40A, 40B, and so on may be appropriately formed on the second surface 72 of the substrate 70. FIG. 4 illustrates two waveguides such as the waveguides 40A and 40B. However, in the sensor 5 according to the one embodiment, any number of (one or more) waveguides may be formed as needed. When the waveguides 40A and 40B are not particularly distinguished from each other, the waveguides 40A and 40B are simply referred to as "waveguides 40" below.

The waveguide 40 may be any waveguide path formed to penetrate through the substrate 70 between the second surface 72 and the first surface 71 of the substrate 70 illustrated in FIG. 4. For example, when the controller 10 includes the transmission unit 20, the waveguide 40 may be a path through which a transmission signal generated in the transmission unit 20 is guided when the transmission signal is output to the transmission antennas 26 (disposed on the first surface 71 of the substrate 70). For example, when the controller 10 includes the reception units 30, the waveguide 40 may be a path through which a reception signal received by the reception antenna 31 (disposed on the first surface 71 of the substrate 70) is guided when the reception signal is input to the transmission unit 20. As described above, in the sensor 5 according to the one embodiment, the substrate 70 may include the waveguide 40. In this case, the waveguide 40 may guide at least one of the transmission wave or the reflected wave between the first surface 71 and the second surface 72.

For example, the sensor 5 illustrated in FIGS. 2 and 4 is a sensor that is based on the radar technology and that can transmit and receive a radio wave in a 77/79 GHz band. In this case, for example, the frequency of the reception signal input to the AD conversion unit 37 through the mixer 35 and an intermediate-frequency filter of the IF unit 36 of the reception unit 30 included in the electronic component 15 is DC (direct current) to several tens of MHz. For example, when impulse noise of a switching power supply or the like in the power supply device 50 enters such a frequency band, the characteristics of the radar may deteriorate in the vicinity of the frequencies.

To avoid such deterioration of the characteristics of the radar as much as possible, the power supply device 50 may include, for example, a low dropout (LDO) regulator or a switching power supply (DC/DC converter) as described above.

The LDO implements low noise as compared with the switching power supply. However, when the LDO has a potential difference between an input and an output, electric power that is a product of the potential difference and an output current becomes a heat loss. For this reason, power consumption increases in the LDO, which necessitates heat dissipation measures. On the other hand, the switching power supply is more efficient than the LDO when a large current flows, and thus allows the system to have relatively small power consumption. However, in the switching power supply, noise generated at switching is likely to be an issue of radiation noise. In particular, radiation noise is likely to be an issue in an area from the power supply device to a smoothing filter. Thus, conduction noise may be an issue in the switching power supply unless a circuit configuration and/or a pattern wiring are correctly designed. The switching power supply often operates at a fixed frequency. Thus, when a radio wave of that frequency enters the waveguide, deterioration may occur at a specific frequency of the radar.

Figure 5:
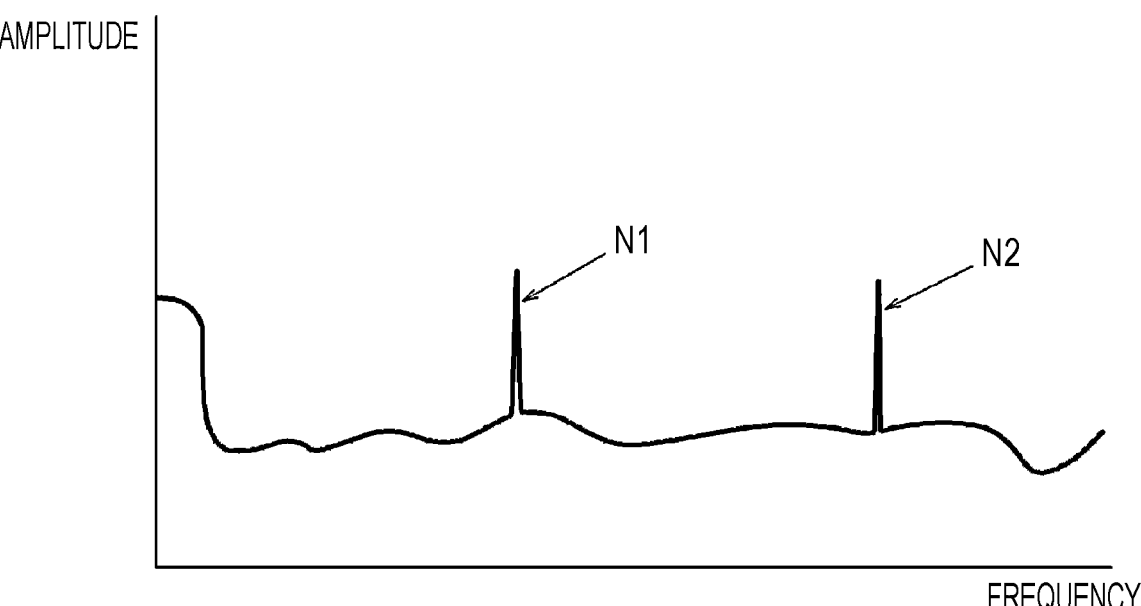
FIG. 5 is a graph illustrating an example of noise that may be addressed in the electronic device according to the one embodiment.

FIG. 5 is a graph illustrating an example of noise that may be generated in the sensor 5 according to the one embodiment when noise countermeasures are not appropriately made.

When noise countermeasures are not appropriately made in the sensor 5 illustrated in FIG. 4, noise such as noise N1 and noise N2, for example, may be generated at specific frequencies as illustrated in FIG. 5. The horizontal axis of FIG. 5 represents a frequency, and the vertical axis of FIG. 5 represents an amplitude of a signal. As illustrated in FIG. 5, the amplitude of the signal sometimes shows steep peaks (the noise N1 and the noise N2) at specific frequencies. When a curve other than the steep peaks (the noise N1 and the noise N2) illustrated in FIG. 5 denotes a noise floor of the reception signal in the AD conversion unit 37, for example, the steep peaks such as the noise N1 and the noise N2 may be a cause of false detection of an object.

To address such noise, in the sensor 5 according to the one embodiment, electromagnetic wave shielding members shield the waveguides 40 and/or the power supply device 50.

Figure 6:
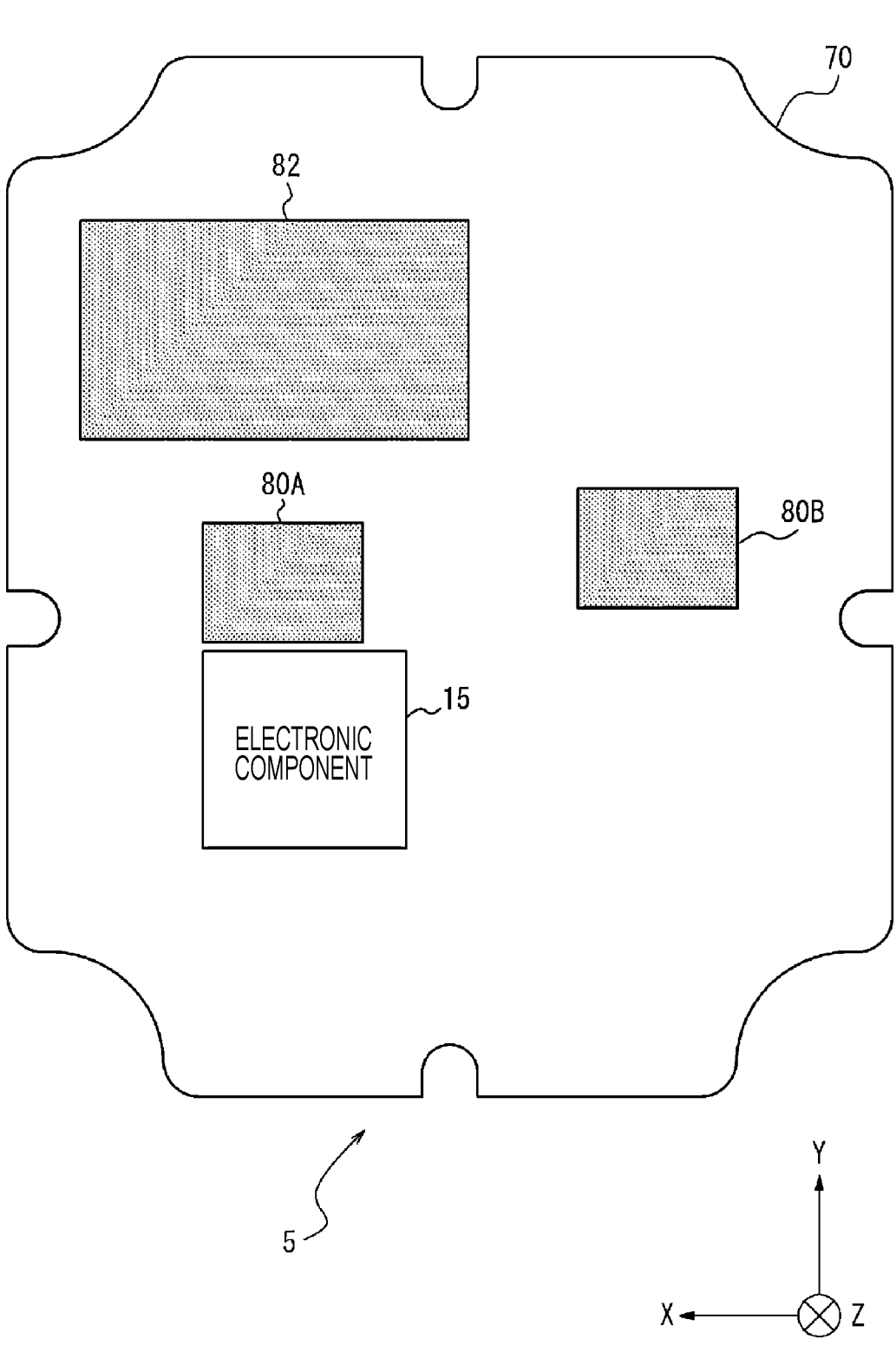
FIG. 6 is a diagram illustrating an example of electromagnetic wave shielding members disposed on the substrate in the electronic device according to the one embodiment.

FIG. 6 is a diagram illustrating an example of a configuration of the sensor 5 according to the one embodiment in which noise countermeasures are made.

As illustrated in FIG. 6, in the sensor 5 according to the one embodiment, an electromagnetic wave shielding member 80A may shield the waveguide 40A illustrated in FIG. 4. As illustrated in FIG. 6, in the sensor 5 according to the one embodiment, an electromagnetic wave shielding member 80B may shield the waveguide 40B illustrated in FIG. 4. When the electromagnetic wave shielding members 80A and 80B are not particularly distinguished from each other, the electromagnetic wave shielding members 80A and 80B are simply referred to as "electromagnetic wave shielding members 80" below. The shielding by the electromagnetic wave shielding member 80 may be, for example, covering the periphery of the waveguide 40 with a shielding plate electrically connected to ground.

The electromagnetic wave shielding member 80 may be any member that shields against an electromagnetic wave. The electromagnetic wave shielding member 80 may be, for example, a plate-like member having a thickness of about 0.25 mm. In general, a relatively thicker shield can have a higher effect. In the sensor 5 according to the one embodiment, the thickness of the electromagnetic wave shielding member 80 may be appropriately determined in consideration of a desirable effect and/or cost, for example. In FIG. 6, the electromagnetic wave shielding member 80 shields each of the two waveguides 40. However, in the sensor 5 according to the one embodiment, for example, the electromagnetic wave shielding member 80 may shield at least one of the multiple waveguides 40.

The electromagnetic wave shielding member 80 may be disposed to shield the waveguide 40 at a position that is apart by a predetermined distance from the second surface of the substrate 70 on which the waveguide 40 is formed.

Figure 7:
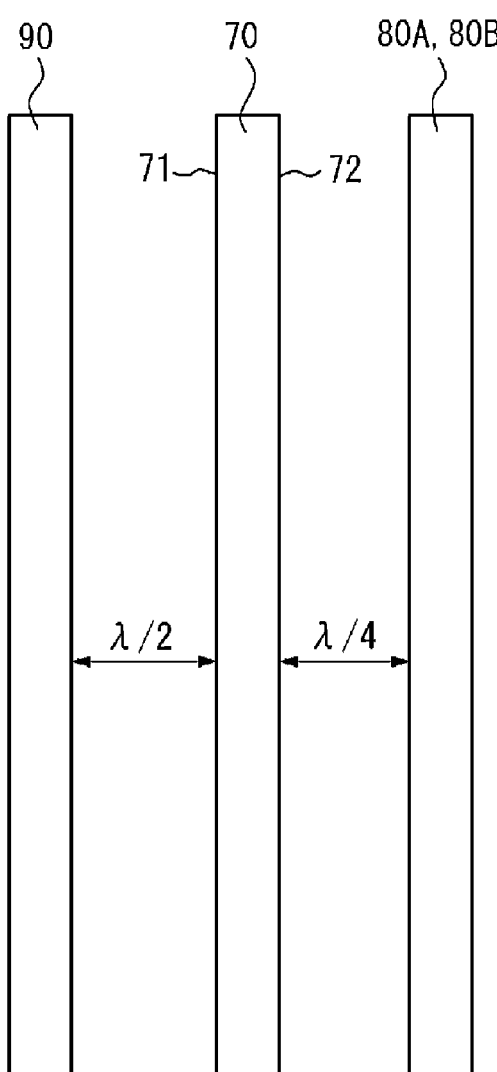
FIG. 7 is a diagram illustrating a positional relationship between members in the electronic device according to the one embodiment.
Figure 7:
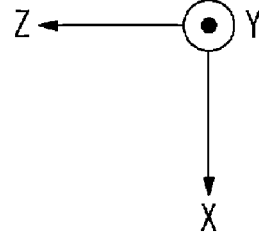

FIG. 7 is a diagram for describing a positional relationship between the substrate 70 and the electromagnetic wave shielding member 80. As illustrated in FIG. 7, the electromagnetic wave shielding member 80 (80A, 80B) may be apart from the second surface of the substrate 70 by a predetermined distance. As illustrated in FIG. 7, the predetermined distance may be, for example, ¼ of a wavelength $\lambda$ of the transmission wave or the reception wave.

As described above, in the sensor 5 according to the one embodiment, the waveguide 40 may be covered with the electromagnetic wave shielding member 80 that is apart from the second surface 72 of the substrate 70 by a distance of ¼ of the wave length $\lambda$ of the transmission wave or the reflected wave.

As illustrated in FIG. 6, in the sensor 5 according to the one embodiment, an electromagnetic wave shielding member 82 may also shield the power supply device 50 illustrated in FIG. 4. The shielding by the electromagnetic wave shielding member 82 may be, for example, covering a periphery of the power supply device 50 and/or a peripheral circuit such as a capacitor with a shielding plate electrically connected to ground.

The electromagnetic wave shielding member 82 may be any member that shields against an electromagnetic wave. The electromagnetic wave shielding member 82 may be, for example, a plate-like member having a thickness of about 0.25 mm. As described above, a relatively thicker shield can have a higher effect. In the sensor 5 according to the one embodiment, the thickness of the electromagnetic wave shielding member 82 may also be appropriately determined in consideration of a desirable effect and/or cost, for example.

Unlike the electromagnetic wave shielding member 80 described above, the electromagnetic wave shielding member 82 may not be apart from the second surface of the substrate 70 by a predetermined distance. For example, the power supply device 50 may be covered with the electromagnetic wave shielding member 82 that is substantially not apart from the second surface 72 of the substrate 70.

As described above, in the sensor 5 according to the one embodiment, the power supply device 50 may be covered with the electromagnetic wave shielding member 82 on the second surface 72 side of the substrate 70.

In the sensor 5 according to the one embodiment, the electromagnetic wave shielding member 82 shields the power supply device 50. Thus, when the power supply device 50 includes an LDO as described above, the electromagnetic wave shielding member 82 functions as a member that promotes heat dissipation of the power supply device 50. In this case, a heat dissipation sheet for promoting heat dissipation may be interposed between the electromagnetic wave shielding member 82 and the power supply device 50. As described above, in the sensor 5 according to the one embodiment, the heat dissipation sheet may be interposed between the power supply device 50 and the electromagnetic wave shielding member 82.

On the other hand, when the power supply device 50 includes a switching power supply as described above, the electromagnetic wave shielding member 82 shields the power supply device 50, so that the electromagnetic wave shielding member 82 functions as a member for enhancing noise countermeasures of the power supply device 50. Therefore, since the power supply device 50 is shielded by the electromagnetic wave shielding member 82 and the analog waveguides 40 are also shielded, the sensor 5 according to the one embodiment can reduce entering noise generated from the power supply device 50.

When the electromagnetic wave shielding member 80 shields the waveguide 40, reflection characteristics of the radar can be canceled by setting the distance between the electromagnetic wave shielding member 80 and the waveguide 40 to $\lambda/4$ as described above. Thus, the sensor 5 according to the one embodiment can implement the sufficient characteristics of the radar while making effective countermeasures against noise.

As described above, the sensor 5 according to the one embodiment can have improved countermeasures against noise generated when a signal for use in detection of an object is transmitted and received.

As described above, the sensor 5 according to the one embodiment may be covered with, for example, a radar cover or housing such as a radome. For example, in the sensor 5 according to the one embodiment, a surrounded portion depicted as the sensor 5 in FIG. 2 may be covered with a resin member 90. The resin member 90 may be, for example, a member such as a radar cover or housing made of resin. Covering the sensor 5 with the resin member 90 in this way can markedly improve the robustness of the sensor 5.

In this case, the resin member 90 may be disposed at a position that is apart from the first surface 71 of the substrate 70 by a predetermined distance as illustrated in FIG. 7. The predetermined distances may be, for example, ½ of the wavelength $\lambda$ of the transmission wave or the reception wave as illustrated in FIG. 7. As described above, the electronic device (the sensor 5) according to the one embodiment may be covered with the resin member 90 that is apart from the first surface 71 of the substrate 70 by a distance of ½ of the wavelength $\lambda$ of the transmission wave or the reflected wave. The electronic device (the sensor 5) according to the one embodiment may have further improved characteristics of the radar thanks to an effect of the resin member 90.

The resin member 90 may have, for example, a thickness represented by Expression (1) below, where $\lambda$ denotes the wavelength of the transmission wave or the reception wave and $\varepsilon_r$ denotes a relative dielectric constant of the resin.

[Math. 1]

$$\frac{\lambda}{2} \times \frac{1}{\sqrt{\varepsilon_r}} \tag{1}$$

The thickness of the resin member 90 may be a thickness in the Z-axis direction illustrated in FIG. 7. Thus, the influence of reflection of the transmission wave or the reception wave in the thickness direction of the resin member 90 may be reduced.

While the present disclosure has been described based on the various drawings and the embodiments, it is to be noted that a person skilled in the art can easily make various variations or corrections based on the present disclosure. Therefore, it is to be noted that these variations or corrections are within the scope of the present disclosure. For example, functions and the like included in each functional unit can be rearranged without causing any logical contradiction. Multiple functional units or the like may be combined into one or may be divided. The embodiments according to the present disclosure described above are not limited to strict implementation according to the respective embodiments described above, and may be implemented by appropriately combining the features or omitting part thereof. That is, a person skilled in the art can make various variations and corrections to the contents of the present disclosure based on the present disclosure. Therefore, these variations and corrections are within the scope of the present disclosure. For example, in each embodiment, each functional unit, each means, each step, or the like can be added to another embodiment or replaced with each functional unit, each means, each step, or the like in another embodiment without causing any logical contradiction. In each embodiment, multiple functional units, means, steps, or the like may be combined into one or may be divided. The embodiments of the present disclosure described above are not limited to strict implementation according to the respective embodiments described above, and may be implemented by appropriately combining the features or omitting part thereof.

The embodiments described above are not limited to implementation as the electronic device (the sensor 5). For example, the embodiments described above may be implemented as a method for controlling a device such as the electronic device (the sensor 5). For example, the embodiments described above may be implemented as a program for controlling a device such as the electronic device (the sensor 5).

The electronic device according to one embodiment may include, as the minimum configuration, at least part of at least one of the sensor 5 or the controller 10, for example. On the other hand, the electronic device according to one embodiment may appropriately include at least any of the signal generating unit 21, the synthesizer 22, the phase control units 23, the amplifiers 24, or the transmission antennas 26 illustrated in FIG. 2 in addition to the controller 10. The electronic device according to the one embodiment may appropriately include at least any of the reception antenna 31, the LNA 33, the phase control unit 34, the mixer 35, the IF unit 36, or the AD conversion unit 37 instead of or along with the functional units described above. The electronic device according to the one embodiment may include a memory of any type. As described above, the electronic device according to the one embodiment can employ various configurations. When the electronic device according to the one embodiment is mounted in the mobility device 100, for example, at least any of the functional units described above may be installed at an appropriate place such as the inside of the mobility device 100. On the other hand, in one embodiment, for example, at least any of the transmission antennas 26 or the reception antennas 31 may be installed outside the mobility device 100.

REFERENCE SIGNS

1 electronic device
5 sensor
10 controller
11 distance FFT processing unit
12 velocity FFT processing unit
13 angle-of-arrival estimating unit
14 object detecting unit
15 electronic component
20 transmission unit
21 signal generating unit
22 synthesizer
23 phase control unit
24 amplifier
26 transmission antenna
30 reception unit
31 reception antenna
33 LNA
34 phase control unit
35 mixer
36 IF unit
37 AD conversion unit
40 waveguide
50 power supply device
60 ECU
70 substrate
80, 82 electromagnetic wave shielding member
90 resin member
100 mobility device
200 object

The invention claimed is:

1. An electronic device comprising:
a transmission antenna;
a transmission unit configured to transmit a transmission wave from the transmission antenna;
a reception antenna;
a reception unit configured to receive, from the reception antenna, a reflected wave that is the transmission wave having been reflected;
a controller configured to detect an object that reflects the transmission wave, based on a transmission signal transmitted as the transmission wave and a reception signal received as the reflected wave;
a power supply device configured to supply electric power to at least any of the transmission unit, the reception unit, or the controller; and
a substrate on which the transmission antenna, the reception antenna, the controller, and the power supply device are disposed,
wherein the transmission antenna and the reception antenna are disposed on a first surface of the substrate,
the transmission unit, the reception unit, the controller and the power supply device are disposed on a second surface of the substrate, the second surface being opposite to the first surface,
the substrate includes a waveguide configured to guide at least one of the transmission wave between the transmission antenna and the transmission unit or the reflected wave between the reception antenna and the reception unit, and the waveguide is covered with an electromagnetic wave shielding member that is apart from the second surface of the substrate by a distance of ¼ of a wavelength of the transmission wave or the reflected wave.

2. The electronic device according to claim 1, wherein the power supply device is covered with an electromagnetic wave shielding member on the second surface side of the substrate.

3. The electronic device according to claim 1, wherein the power supply device includes a low dropout regulator.

4. The electronic device according to claim 3, wherein the power supply device is covered with an electromagnetic wave shielding member on the second surface side of the substrate, and a heat dissipation sheet is interposed between the power supply device and the electromagnetic wave shielding member.

5. The electronic device according to claim 1, wherein the power supply device includes a switching power supply.

6. The electronic device according to claim 1, wherein the electronic device is covered with a resin member that is apart from the first surface of the substrate by a distance of ½ of a wavelength of the transmission wave or the reflected wave.

7. The electronic device according to claim 1, wherein the transmission unit includes a signal generating unit, a synthesizer, a phase control unit, and an amplifier, and the reception unit includes a low noise amplifier, a phase control unit, a mixer, a frequency conversion unit, and an analog-to-digital conversion circuit.

\* \* \* \* \*